United States Patent
Strand et al.

(10) Patent No.: US 10,549,487 B1
(45) Date of Patent: Feb. 4, 2020

(54) SAFETY DATA SHEETS (SDS) SIGNING FOR FEEDSTOCK MATERIALS

(71) Applicant: AMAZON TECHNOLOGIES, INC., Seattle, WA (US)

(72) Inventors: William Alexander Strand, Sammamish, WA (US); Luan Khai Nguyen, Auburn, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 848 days.

(21) Appl. No.: 14/838,123

(22) Filed: Aug. 27, 2015

(51) Int. Cl.
*B33Y 10/00* (2015.01)
*B29C 67/00* (2017.01)
*G05B 19/408* (2006.01)
*B33Y 30/00* (2015.01)
*B33Y 50/02* (2015.01)
*B33Y 70/00* (2015.01)

(52) U.S. Cl.
CPC ........ *B29C 67/0088* (2013.01); *G05B 19/408* (2013.01); *B33Y 10/00* (2014.12); *B33Y 30/00* (2014.12); *B33Y 50/02* (2014.12); *B33Y 70/00* (2014.12); *G05B 2219/32001* (2013.01); *G05B 2219/49023* (2013.01)

(58) Field of Classification Search
CPC ..... B29C 67/0088; B33Y 10/00; B33Y 50/02; B33Y 70/00
USPC ....................................................... 264/40.1
See application file for complete search history.

(56) References Cited

U.S. PATENT DOCUMENTS

| | | | |
|---|---|---|---|
| 2011/0121476 A1 | 5/2011 | Batchelder et al. | |
| 2014/0117585 A1* | 5/2014 | Douglas | B33Y 30/00 264/401 |
| 2014/0200697 A1 | 7/2014 | Cheng | |
| 2014/0283104 A1 | 9/2014 | Nilsson | |
| 2015/0045934 A1 | 2/2015 | Kallenbach et al. | |
| 2015/0165690 A1 | 6/2015 | Tow | |
| 2016/0339640 A1 | 11/2016 | Juan et al. | |

FOREIGN PATENT DOCUMENTS

WO  WO-2015108551 A1 * 7/2015 ............. B33Y 30/00

OTHER PUBLICATIONS

Williams, Cedrick, "Non-final Office Action dated Jul. 20, 2017", U.S. Appl. No. 14/459,040, The United States Patent and Trademark Office, Jul. 20, 2017.
Williams, Cedrick S., "Non-final Office Action dated Dec. 29, 2016", U.S. Appl. No. 14/459,040, The United States Patent and Trademark Office, Dec. 29, 2016.
Williams, Cedrick S., "Notice of Allowance dated Oct. 5, 2017", U.S. Appl. No. 14/459,040 The United States Patent and Trademark Office, Oct. 5, 2017.

* cited by examiner

*Primary Examiner* — Christina A Johnson
*Assistant Examiner* — Xue H Liu
(74) *Attorney, Agent, or Firm* — Lindauer Law, PLLC

(57) ABSTRACT

Feedstock material used by an automated fabrication device may provide machine readable information about the feedstock material. In one implementation, the machine readable information may provide quality assurance for a produced object. The feedstock material or the object produced may store encoded machine readable information using one or more of a code, a taggant, a chemical marker, or a physical marker. The encoded machine readable information may be used to authenticate the composition of the produced object.

20 Claims, 7 Drawing Sheets

SAFETY DATA SHEETS (SDS) SIGNING FOR FEEDSTOCK MATERIALS

BACKGROUND

Automated fabrication devices (AFDs) such as three-dimensional (3D) printers, computer numerical controlled (CNC) machines, computer-controlled milling machines, and so forth, are used to fabricate objects from raw components according to control instructions. The fabrication of all or part of an object using AFDs offers the ability for users to procure objects on demand, procure objects that are customized, and so forth.

The public may benefit from fabrication processes that verify materials being fed into the AFDs meet specified safety requirements.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
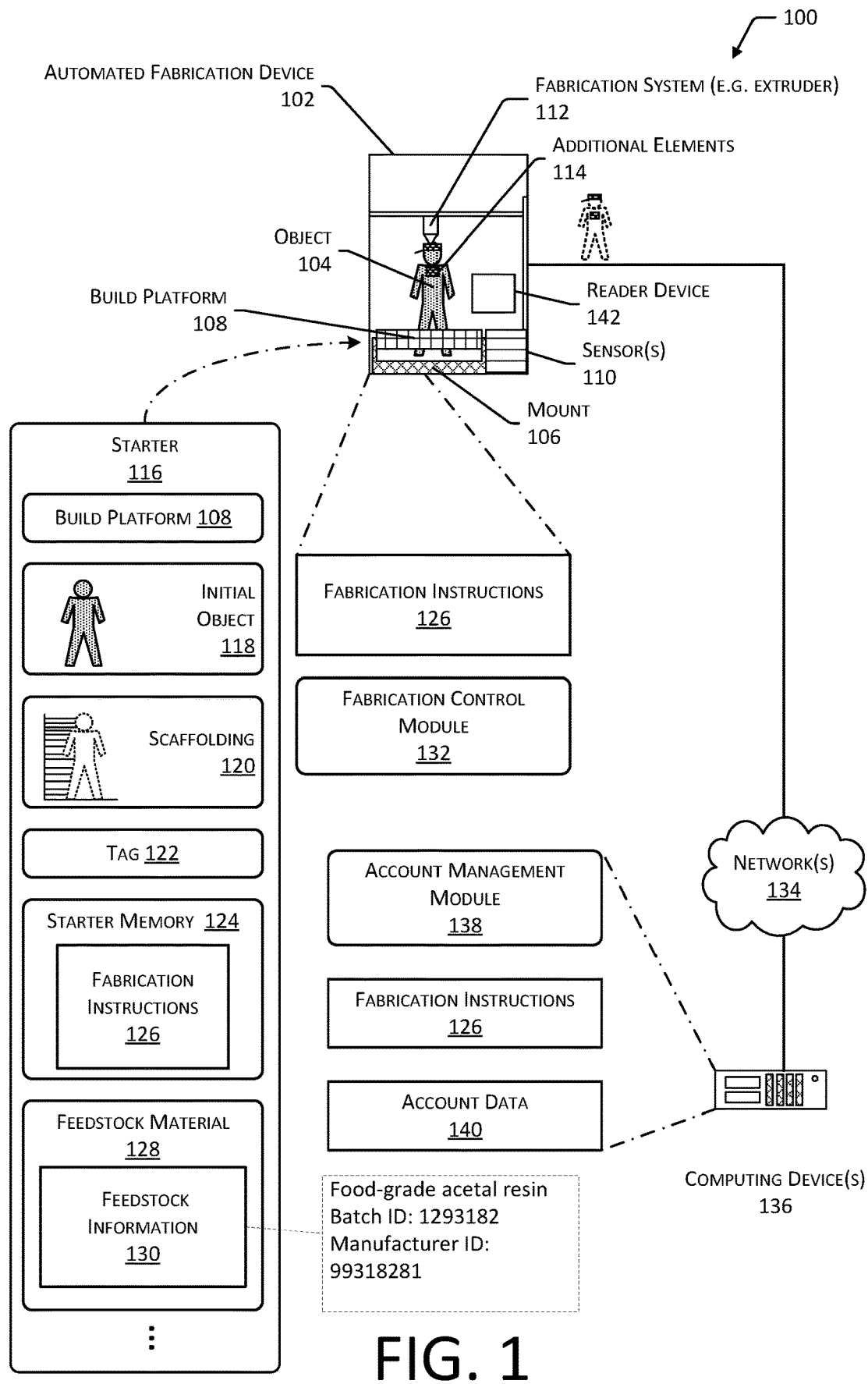
FIG. 1 is an illustrative system of an AFD configured to use a starter to fabricate at least a portion of an object.

While implementations are described herein by way of example, those skilled in the art will recognize that the implementations are not limited to the examples or figures described. It is understood that the figures and detailed description thereto are not intended to limit implementations to the particular form disclosed but, on the contrary, the intention is to cover modifications, equivalents, and alternatives falling within the spirit and scope as defined by the appended claims. The headings used herein are for organizational purposes and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Objects may be fabricated, at least in part, by AFDs such as 3D printers, computer numerical controlled (CNC) machines, computer-controlled milling machines, and so forth. As AFDs continue to increase in capability and decrease in cost, availability of these devices grows. AFDs may be used in homes, small businesses, retail stores, distribution centers, and so forth, to provide objects for use. For example, objects may comprise repair parts such as gears, clips, frames, and so forth. In another example, objects may comprise toys, household goods, appliances, tools, and so forth.

Described in this disclosure are techniques and devices suitable for utilizing feedstock material that includes machine readable feedstock information. The feedstock information may includes digitally signed data. The machine readable feedstock information may be used for one or more of authenticating, identifying, preventing unauthorized reproduction, or providing other quality assurance factors for the feedstock materials and for objects produced using the feedstock materials. In one embodiment, the AFD may be configured to accept portions of, or coupled to, a "starter". The starter may be deployed in form factors such as a cartridge, enclosure, kit, and so forth. The starter may comprise one or more of a build platform, an initial object, scaffolding, starter memory, or feedstock material. The build platform may comprise a surface upon which the object is to be fabricated. For example, the build platform may comprise a stage upon which a polymer may be deposited by a print head or extruder. The initial object may comprise a template, partial portion, framework, interior structure, and so forth, onto which additional elements may be printed. In some implementations, the initial object may include kit parts such as electronic or optical components that are not able to be fabricated by the AFD. The scaffolding may comprise temporary structures used to support the object or a portion thereof during fabrication but that are intended to be removed after completion of the object.

The starter memory of the starter may be configured to store fabrication instructions. The starter memory may comprise computer readable storage media (CRSM) such as flash memory, magnetic media, optical media, and so forth. For example, the starter memory may comprise a flash memory device configured to couple to a Universal Serial Bus (USB) interface. The starter memory may be configured to store all or a portion of the fabrication instructions used to fabricate the object. For example, the AFD may be configured to begin fabrication of the object after coupling to the starter and accessing the fabrication instructions from the starter memory. By storing at least a portion of the fabrication instructions in the starter memory, the need for a network connection to download or otherwise transfer fabrication instructions from a server or other computing device may be reduced or eliminated.

In one implementation, feedstock materials used by an AFD may be storage media used to store machine readable feedstock information to provide quality assurance. The machine readable feedstock information may be used to verify that the feedstock materials meet safety requirements prescribed by a safety data sheet (SDS) for ratings of toxicity of the feedstock materials, the Consumer Product Safety Commission (CPSC) specifications, the Occupational Safety and Health Administration (OSHA) specifications, the American Society for Testing and Materials (ASTM) standards, and so forth. The feedstock materials themselves may be encoded with a digital signature from the manufacturer that is used to ensure the feedstock material is of a particular quality, dimension, composition, fit, or formation measurement suitable for the object being produced. For example, digital quality and composition may refer to a formulation of feedstock material to be used that is intended for producing a professional, high quality, 3D object. Formation measurements may be provided by the digital signature to identify the temperature to be used with a particular diameter of the feedstock material. Feedstock material with a smaller diameter can be heated faster as it takes less time for the heat to reach the center so the object may be printed faster. Formation measurements allow the software controlling the AFD to calculate the extrusion volume based on the diameter of the feedstock material, the diameter of the extruder nozzle, and the extrusion speed. This digital signature may refer to a particular SDS, material specification sheet, and so forth.

In one implementation, feedstock materials may be used to store machine readable information about the feedstock materials. The machine readable feedstock information may be used to ensure quality assurance associated with the object being produced. The machine readable feedstock information may be used to specify composition, toxicity, strength, source, or other information about the feedstock material. In some implementations, sensors may be used to inspect the object. Based on one or more signals obtained from inspecting the object, the composition, dimensions, orientation, and other production tolerances, as specified in the machine readable feedstock information obtained from the feedstock materials, may be verified.

In one implementation, feedstock materials used by an AFD may be provided with machine readable feedstock information for authenticating the feedstock material or the object being produced. The feedstock materials may include a feature, a code, a taggant, and so forth, indicating the source of the object or feedstock material. For example, the feature may be a chemical or physical marker added to the feedstock material used to produce the object to allow various forms of testing. Such testing may include determining the authenticity of the feedstock materials or the object, the manufacturer, the country of origin, and so forth. Authentication is a process for determining the source of the feedstock materials. Machine readable feedstock information is provided in, on or with the feedstock materials. To provide authentication, credentials obtained from the feedstock information are compared to machine readable feedstock information maintained in a database or within an authentication server. If the credentials match the feedstock information in the database, the source of the feedstock materials are authenticated and use of the feedstock materials is authorized.

In one implementation, feedstock materials used by an AFD may be used to store machine readable feedstock information to prevent unauthorized reproduction of the feedstock materials or the object being produced. A chemical or physical marker may be added to the feedstock materials or to the object produced to determine whether the materials or the objects produced are authentic. The machine readable feedstock information may thus allow testing that establishes confidence and trust that the feedstock material or the object is not fake, modified, or otherwise adulterated. For example, objects may be an unauthorized reproduction that closely mimics or matches the feedstock materials from a desired source. However, by including a marker in the feedstock materials, the feedstock materials may be analyzed at a receiving point in the supply chain, at the AFD, or at an output stage for a produced object. If such a marker is not detected, or does not match a marker maintained in a database, the feedstock materials may be identified as being an unauthorized reproduction.

In one implementation, feedstock materials used by an AFD may include machine readable feedstock information to provide authorization for the feedstock materials to produce the object. The machine readable feedstock information may be inspected to verify the feedstock materials have the characteristics for producing the object. For example, if the feedstock materials are to produce a toy, certain types of plastics should be avoided. Plastics, such as polyvinyl chloride (PVC), phthalates, and Bisphenol-A (BPA) have been identified as being unsafe for children's toys. Thus, the machine readable information for feedstock materials may be analyzed to identify the type of plastic the feedstock materials are comprised of so that unsafe plastics may be avoided when producing certain objects, such as children's toys and food containers.

Feedstock material information may be machine readable and stored in, on, or with the feedstock material using a physical pattern provided thereon, a physical taggant, a chemical taggant, and so forth, that may be sensed before or after the object is produced. For example, a physical pattern may be notched or extruded physically into the feedstock material using a laser to provide machine readable feedstock information to be associated with the feedstock material. The physical pattern may then be detected and the machine readable feedstock information processed so that the AFD may use the machine readable feedstock information when using the feedstock material to produce an object, e.g., for authentication, quality assurance, etc.

Taggants are materials, substances, molecules, ions, polymers, nanoparticles, microparticles, or other matter, incorporated into, onto, or otherwise associated with objects for the purposes of identification or quantitation. A physical taggant provided to the feedstock material may include microscopic particles. The microscopic particles may be made of different materials.

A chemical taggant may be introduced into at least a portion of the feedstock material and may be detected using a fluorescent scanner, a microscopic (optical) sensor, a chemical detector that senses molecules in the air and analyzes their chemical composition, and so forth. A laser may be used to vaporize a chemical taggant to release molecules in the chemical taggant.

A physical pattern may also be provided by magnetic coding. For example, the feedstock material may be a material that includes a plastic component and a metal wire affixed to the plastic component, wherein the metal is magnetically or physically encoded to identify the plastic. The metal wire may then be removed as the plastic is used in the formation of the object. The machine readable information of the feedstock materials or the object may be provided by elements that may be sensed ultrasonically, such as voids, cracks, embedded materials, and so forth. The machine readable feedstock information provided with the feedstock materials may also be encrypted using one or more cryptographic techniques. The encryption may include symmetric key encryption, public key/private key encryption, and so forth. For example, the information in the feedstock materials may be encrypted using a public key associated with a computing device such as a server, which may then use a private key to decrypt the information.

In some implementations digital certificates may be used as well. For example, digital certificates may be employed to establish trust relationships between the devices in the system, such as between the AFD and the computing device. Once trusted, the encrypted information stored in the feedstock materials may be decrypted and authenticated to confirm authenticity of the feedstock materials, to gain permission to fabricate the object, and so forth.

The machine readable feedstock information may be on the feedstock material, in the feedstock material, injected into the produced object, and so forth. In some implementations the information may be stored using a taggant that is detectable by any physical or chemical property, such as light, magnetism, sound, or reactivity. The taggant may be invisible to the human eye (even under magnification) but may be made visible by creating the right conditions such as illumination with ultraviolet light, heating, chemical activation, and so forth. When viewed under those conditions, a unique taggant image representation may be captured from feedstock material and stored in a database for later reference. When an item is to be authenticated, the taggant image is produced and compared to a representation of taggant images stored in the database. During the fabrication of the object, the AFD consumes at least a portion of the feedstock material. As a result of the consumption, in some implementations at least a portion of the information may be destroyed. Once destroyed, the information may no longer be available. This destruction may prevent counterfeiting of feedstock material, restrict production of objects to authorized copies, and so forth.

In addition to analyzing the feedstock material during consumption, in some implementations, each produced object may be analyzed during or after fabrication. For example, a predetermined area of the produced object may be analyzed to detect a particular structure formed during fabrication, or for taggants that are not destroyed during fabrication. The particular structure, taggants, and so forth may encode information. This information may be used to authenticate the produced object.

Recently, concern about the safety of plastic used for water bottles and other food containers that may have been leaching chemicals into the water or food stored therein has been brought to the public's attention. However, the concern does not stop with food storage containers. Small children may put toys in their mouth while playing. Generally, a product may be declared as a toy when it fulfills strict conditions of safety regarding materials, shape, packaging, and so forth. Accordingly, a toymaker may want to limit the conditions under which a particular toy is fabricated. Thus, feedstock material used by an AFD may include machine readable information about the feedstock material.

Illustrative System

FIG. 1 is an illustrative system 100 for automated fabrication of an object. In this illustration, an automated fabrication device (AFD) 102 is depicted. The AFD 102 may use one or more of additive manufacturing, subtractive manufacturing, or both, to create at least a portion of an object 104. Additive techniques selectively apply or manipulate portions of a feedstock material to form a portion of the object 104. Feedstock material is the source material used by a 3D printer to create physical objects. For example, small amounts of the feedstock material used in an additive process may be repeatedly combined, such as by melting a plastic filament and depositing the plastic, layer by layer, to form an object 104. Additive techniques may include extrusion of a polymer from an extruder and depositing the polymer at particular positions. In another example, additive techniques may include selective heating of a powder to produce the object by way of sintering. A wide variety of additive techniques are available. In comparison, subtractive techniques remove material from the feedstock material. For example, a cutting head may be used to remove material from a block of feedstock material to form at least a portion of the object 104. In one instance, the AFD 102 may comprise an additive 3D printer, such as the MakerBot Replicator from MakerBot Industries LLC of Brooklyn, N.Y., USA; the 3D Printer Creator from Zhejiang Flashforge 3D Technology Co. Ltd., of Zhejiang, China; and so forth.

The AFD 102 may include a mount 106 configured to couple to a build platform 108. The mount 106 may comprise a frame, clips, mechanical engagement features, and so forth, configured to retain at least a portion of the build platform 108 during operation of the AFD 102. The build platform 108 may comprise a surface, chamber, container, and so forth, configured to hold the object 104, or portions thereof, during fabrication. In some implementations, the build platform 108 may be configured with mounting attachment points suitable for holding the object 104 during fabrication. The build platform 108 may also include one or more of heating devices, release agents, cooling devices, and so forth.

The AFD 102 may include one or more sensors 110. The sensors 110 are configured to gather sensor data associated with operation of the AFD 102. For example, the sensors 110 may be configured to monitor consumption of feedstock material, monitor conditions of the build platform 108, and so forth.

The AFD 102 may include one or more fabrication systems 112. The fabrication systems 112 are configured to deposit, distribute, manipulate, shape, mill, drill, or otherwise modify feedstock material to form the object 104. The fabrication systems 112 may implement additive techniques, subtractive techniques, or both, to form at least a portion of the object 104 during fabrication. Additive techniques selectively apply or manipulate portions of the feedstock material to form a portion of the object 104. For example, additive techniques include extrusion of a polymer from an extruder and depositing the polymer at particular positions. In another example, additive techniques include selective heating of a powder to produce the object 104 by way of sintering. A wide variety of additive techniques are available, including, but not limited to, extrusion deposition, granular material binding, lamination, photopolymerization, stereolithography, and so forth. In comparison, subtractive techniques remove material from the feedstock material. For example, a cutting or milling head may be used to remove material from a block of feedstock material to form the object 104.

In some implementations, the AFD 102 may be configured to add one or more additional elements 114 to the object 104. For example, the object 104 may comprise a toy figurine and the additional elements 114 may include a hat and a backpack. The additional elements 114 may be joined or bonded to the object 104, or may be pieces which may be attached to the object 104. For example, the additional element 114 of the hat may be removable, while the backpack may be joined to a dorsal section of the figurine object 104.

The AFD 102 may be configured to accept portions of, or be coupled to, a starter 116. The starter 116 may be deployed in form factors such as a cartridge, enclosure, kit, and so forth. In some implementations, the starter 116 may include a build platform 108. For example, operation of some additive fabrication systems 112 may result in the build platform 108 being littered with byproducts of the fabrication process. By including the build platform 108 within the starter 116, a known, good starting point for the fabrication is provided. The build platform 108, as included in the starter 116, may result in improved quality of the fabricated object 104.

An initial object 118 may be included with the starter 116. The initial object 118 may comprise one or more previously completed elements of the object 104. For example, the initial object 118 may include a template, partial portion, framework, interior structure, and so forth, onto which additional elements 114 may be printed to form the finished object 104. For example, the initial object 118 may comprise an anthropomorphic shape, onto which additional elements 114 such as body contours and facial features may be applied to produce a particular figurine. In some implementations, the initial object 118, or the starter 116 may include other parts. For example, electronic or optical components that are not able to be fabricated by the AFD 102 may be included for inclusion into the object 104 during or after fabrication. In some implementations, the initial object 118 may be joined by way of one or more temporary or removable members to the build platform 108.

Scaffolding 120 may also be included with the starter 116. The scaffolding 120 may comprise temporary structures used to support the object 104 or a portion thereof during fabrication. The scaffolding 120 is intended to be removed after completion of the object 104. For example, the scaffolding 120 may be configured to support an outstretched arm of the figurine during fabrication to prevent sagging during fabrication. In some implementations, the scaffolding 120 may comprise a material different from that used to fabricate the object 104. For example, the scaffolding 120 may comprise a water-soluble material such that the object 104 and scaffolding 120 may be immersed in water after fabrication is complete, with the water causing the scaffolding 120 to disassociate from the object 104. In some implementations, the scaffolding 120 may be joined to the build platform 108.

The starter 116, or other items may be equipped with one or more tags 122 that may provide data. The starter 116 may also include one or more starter memory 124 devices. The starter memory 124 devices may be configured to store fabrication instructions 126. The starter memory 124 devices may comprise a CRSM. The CRSM may be any one or more of an electronic storage medium, a magnetic storage medium, an optical storage medium, a quantum storage medium, a mechanical computer storage medium, and so forth. For example, the starter memory 124 may comprise flash memory, magnetic media, optical media, and so forth. The starter memory 124 may comprise media alone or may include one or more electronic or optical components configured to access the starter memory 124. For example, the starter memory 124 may include a USB interface. The starter memory 124 may be configured to store all or a portion of the fabrication instructions 126 used to fabricate the object 104, or a portion thereof. The fabrication instructions 126 provide control to the fabrication system 112 of the AFD 102 to form the object 104 or portion thereof.

Feedstock material 128 may be included with the starter 116. The feedstock material 128 comprises one or more materials suitable for use by the fabrication system 112 of the AFD 102 to produce at least a portion of the object 104 or the additional elements 114. The feedstock material 128 may include, but is not limited to, a polymer, metal, ceramic, foodstuffs, and so forth. For example, the feedstock material 128 may comprises starches, sugars, edible polymers, and so forth.

Inclusion of feedstock material 128 with the starter 116 may be used to maintain quality control over the object 104. For example, an object 104 may include or be associated with a particular brand name, logo, or trademark, which may be associated with a particular degree of quality. By including at least a portion of the feedstock material 128 in the starter 116, quality of the finished object 104, in accordance with the desired degree of quality, may be maintained.

In some implementations the fabrication of the object 104 may include forming structures that present information indicative of certification of that object by a certifying authority. For example, the object 104 may be formed with the "UL" logo when that object 104 has been certified by Underwriters Laboratories Inc., the "CSA" logo when certified by the Canadian Standards Association, and so forth. Verification of the object 104 may include using at least a portion of the machine readable feedstock information 130 (feedstock information) to confirm the certification status. For example, the machine readable feedstock information 130 may comprise a digital certificate that may be sent to a computing device 136 for authentication. In some implementations, the starter 116 may include an initial object 118 that is formed except for the inclusion of the certification markings. For example, the fabrication may include the addition of the certifications appropriate to the geographic location of the AFD 102.

The feedstock material 128 may be provided in one or more form factors including, but not limited to: powder, pellets, filaments, strips, sheets, gel, liquid, and so forth. For example, where the feedstock material 128 comprises a filament, the feedstock material 128 may be stored on a feedstock material spool within the starter 116. During operation of AFD 102, the feedstock material 128 may be distributed to the fabrication system 112, which consumes the feedstock material 128 to produce at least a portion of the object 104. The consumption of the feedstock material 128 may comprise hardening, melting, sintering, milling, and so forth.

The feedstock material 128 may manifest machine readable feedstock information 130. The machine readable feedstock information 130 provided to the feedstock material 128 may be digitally signed data. A digital signature ensures the source of the feedstock material 128 and the information provided by the feedstock information 130 is reliable. For example, the feedstock material 128 may be digitally signed using a party's private signature key, creating a "digital signature" that is stored with the feedstock material 128. At a later date, the signature may be validated before use by the AFD 102 using a public key. Validating the digital signature not only confirms who signed it, but also ensures that there have been no alterations to the feedstock material 128 since it was signed. Thus, feedstock material 128 that includes feedstock information 130 about the purity, toxicity, source, etc. of feedstock material 128 may be authenticated using digitally signed feedstock information 130.

The feedstock information 130 may comprise a pattern present within the feedstock material 128 but not explicitly impressed thereupon. For example, the feedstock information 130 may comprise an inherent pattern resulting from the creation of the feedstock material 128 such as a random series of striations on a surface of a filament of feedstock material 128. The random series of striations may be used as an identifier that is used to reference a database to determine whether a record in the database corresponds to the identifier. A record corresponding to the identifier may then be used to provide information regarding the feedstock material 128.

In comparison, the feedstock information 130 may comprise a pattern from input data that has been impressed upon, or otherwise written to, the feedstock material 128. For example, during preparation of the starter 116, a portion of the feedstock material 128 may be modified to present features indicative of binary ones and zeroes. Continuing the example, grooves and pits may be melted into the feedstock material 128 using infrared light. In some implementations, different portions or sections of the feedstock information 130 may be interleaved with one another. The feedstock information 130 may include parity values, tracking or alignment values, cyclic redundancy check values, and so forth. The feedstock information 130 may identify the feedstock material 128, or provide information about the feedstock material 128. In some implementations, the feedstock information 130 may include a digital signature or digitally signed data. The digitally signed data may include, or may be used to reference, information about composition, batch identifier, manufacturer identifier, and so forth.

The fabrication instructions 126 may specify safety, performance, or other requirements for the feedstock material 128 used to form the object 104, such as rigidity, melting temperature, toxicity, and so forth. For example, the safety and quality of the feedstock material 128 used to form a child's toy may be important. In another example, the safety and quality of edible feedstock material 128 may be assured. For example, the machine readable feedstock information 130 may include expiration data, date and place prepared, and so forth.

A printing mechanism, such as an AFD 102, may verify that the feedstock material 128 being fed into it meets the safety requirements that the fabrication instructions 126 specify. The feedstock material 128 itself may be encoded with a digital signature from the manufacturer. This digital signature may be used to ensure that the feedstock material 128 is the correct quality and suitable for the object 104 being printed. The feedstock material 128 itself may be encoded with a digital signature from the manufacturer that is used to ensure the feedstock material 128 is of a particular quality, dimension, composition, fit, or formation measurement suitable for the object 104 being produced. For example, the digital quality and composition may refer to a formulation of feedstock material 128 to be used that is intended for producing a professional, high quality, 3D object 104. Formation measurements may be provided by the digital signature to identify the temperature to be used with a particular diameter of the feedstock material 128. Feedstock material 128 with a smaller diameter can be heated faster as it takes less time for the heat to reach the center so the object 104 may be printed faster. Formation measurements allow the software controlling the AFD 102 to calculate the extrusion volume based on the diameter of the feedstock material 128, the diameter of the extruder nozzle and the extrusion speed.

In some implementations, the starter 116 may include other items (not shown). For example, the starter 116 may include one or more of print heads, extruders, tools, solvents, paints, surface coating materials, and so forth. One or more of the components of the starter 116, as described herein, may be implemented in various configurations. For example, the build platform 108 may be configured to hold or retain the starter memory 124. In another example, the build platform 108 may be configured to hold or retain the feedstock material 128. The fabrication control module 132 is configured to use the fabrication instructions 126 to direct operation of the fabrication system 112 or other systems of the AFD 102. The AFD 102 is discussed in more detail below with regard to FIG. 2.

The AFD 102 may couple to one or more networks 134. The networks 134 may include public networks, private networks, or a combination thereof. The networks 134 may include, but are not limited to, personal area networks (PANs), local area networks (LANs), wide area networks (WANs), and so forth. The networks 134 may communicate using Ethernet, Wi-Fi, Bluetooth, ZigBee, 3G, 4G, or other technologies.

A computing device 136, such as a server, may be coupled to the network 134 and may be in communication with one or more of the AFD 102, other computing devices 136, and so forth. The computing device 136 may comprise one or more physical computing devices, virtual computing devices, or utilize a combination thereof. In some implementations, the computing device 136 may not require end-user knowledge of the physical location and configuration of the system that delivers the services. For example, the server computing devices 136 may be described using expressions including, but not limited to, "on-demand computing", "software as a service (SaaS)", "platform computing", "network-accessible platform", "cloud services", "data centers", and so forth. Services provided by the computing device 136 may be distributed across one or more physical or virtual devices.

The computing device 136 may include one or more modules and data including, but not limited to, an account management module 138, fabrication instructions 126, account data 140, and so forth. The account management module 138 may be configured to exchange information with the AFD 102. The account management module 138 may be configured to use fabrication instructions 126 associated with the object 104. Once retrieved, the fabrication instructions 126 may be provided to the AFD 102.

The fabrication instructions 126 may include instructions to construct less than the resulting end object 104. For example, the fabrication instructions 126 may specify how to convert the initial object 118 to the finished object 104 by adding one or more additional elements 114.

The account data 140 may comprise information about the AFD 102, information indicative of use rights associated with the fabrication instructions 126, and so forth. The account data 140 may be used by the account management module 138 during operation. In one implementation, the account management module 138 may be configured to track fabrication statistics, such as when the object 104 has been fabricated, and associate that information with a particular account. This information may be stored as the account data 140 for billing, process improvement, logistical support, and so forth.

At least one reader device 142 may be used to obtain the machine readable feedstock information 130 by scanning the feedstock material 128 or the object 104 itself. The machine readable feedstock information 130 may be provided to the computing device 136 for processing to authenticate, authorize the use of, prevent unauthorized reproduction of the feedstock material 128 or the object 104, or for other purposes. Additional reader devices 142 may be provided, for example, to scan the feedstock material 128 for feedstock information 130 as it is received, as feedstock material 128 is used or the object 104 is formed, and after the object 104, or stage thereof has been completed. As described above, the AFD 102 may incorporate one or more fabrication systems 112. For example, the fabrication system 112, e.g., an extruder, uses an extrusion additive process configured to extrude or otherwise emit at least a portion of feedstock material 128 selectively. In another example, the fabrication system 112 may comprise a laser configured to sinter at least a portion of the feedstock material 128. A feedstock handler may comprise one or more mechanisms configured to direct at least a portion of the feedstock material 128 from the starter 116 or other reservoir or storage location for feedstock material 128 that is external to the starter 116. The feedstock handler may comprise motors, rollers, guides, and so forth. During the fabrication of the object 104, the AFD 102 may consume at least a portion of the feedstock material 128. As a result of the consumption, at least a portion of the machine readable feedstock information 130 may be destroyed. Once destroyed, the machine readable feedstock information 130 may no longer be available. For example, the machine readable feedstock information 130 of the feedstock material 128 may be notches, extrusions, voids, or cracks such that when the object 104 is formed using the feedstock material, the notches, extrusions, voids, or cracks are destroyed as the feedstock material 128 is extruded to make the object 104. When the machine readable feedstock information 130 of the feedstock material 128 includes taggants, the information provided by the taggants in the feedstock information 130 may be destroyed by the disassociated placement of the taggants as the object 104 is formed.

Figure 2:
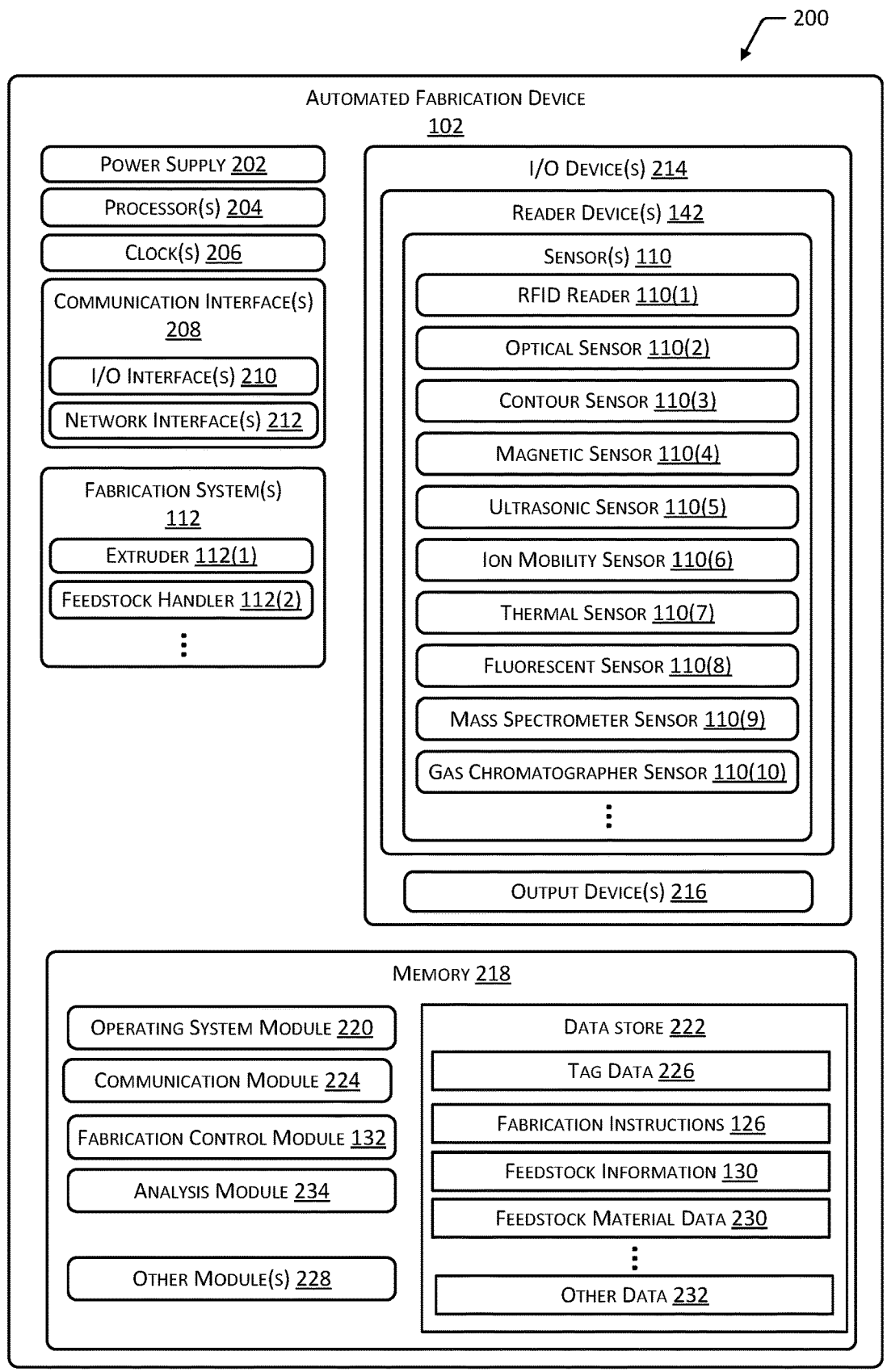
FIG. 2 illustrates a block diagram of the AFD configured to fabricate at least a portion of the object using the starter.

FIG. 2 illustrates a block diagram 200 of the AFD 102 configured to use the starter 116 to fabricate an object 104. One or more power supplies 202 are configured to provide electrical power suitable for operating the components in the AFD 102. In some implementations, the power supply 202 may comprise a rechargeable battery, fuel cell, photovoltaic cell, power conditioning circuitry, mains power, and so forth.

The AFD 102 may include one or more hardware processors 204 (processors) configured to execute one or more stored instructions. The processors 204 may comprise one or more cores. One or more clocks 206 may provide information indicative of date, time, ticks, and so forth. The AFD 102 may include one or more communication interfaces 208 such as input/output (I/O) interfaces 210, network interfaces 212, and so forth. The communication interfaces 208 enable the AFD 102, or components thereof, to communicate with other devices or components. The communication interfaces 208 may include one or more I/O interfaces 210. The I/O interfaces 210 may comprise interfaces such as Inter-Integrated Circuit (I2C), Serial Peripheral Interface bus (SPI), USB as promulgated by the USB Implementers Forum, RS-232, and so forth. The I/O interface(s) 210 may couple to one or more I/O devices 214. The I/O devices 214 may include input devices such as one or more reader devices 142 and output devices 216.

The reader devices 142 may include one or more sensors 110 including an RFID reader 110(1), near field communication (NFC) system, and so forth. An optical sensor 110(2) may be configured to generate data responsive to light. The light may comprise one or more of infrared, visible, ultraviolet, or other wavelengths of light. The optical sensor 110(2) may comprise a photodiode, photodetector, charge coupled device, complementary metal oxide semiconductor device, microbolometer, and so forth. In some implementations, the optical sensor 110(2) may comprise a plurality of elements configurable to generate an image. For example, the optical sensor 110(2) may comprise an optical emitter configured to emit light and an optical receiver configured to receive reflected or fluoresced light. In some implementations, the feedstock information 130 may be represented as variations in color of at least a portion of the feedstock material 128 or at least one taggant provided in or with the feedstock material 128. Continuing the example, the optical sensor 110(2) may be used to read machine readable feedstock information 130 provided as an optically readable pattern present on or within the feedstock material 128.

A contour sensor 110(3) may be configured to determine one or more surface characteristics or shapes of at least a portion of the feedstock material 128. The contour sensor 110(3) may comprise a contact element configured to touch at least a portion of the feedstock material 128, or the contour sensor 110(3) may comprise a non-contact device. For example, the contact sensor 110(3) may comprise a member or probe such as a metal whisker that is drawn across a portion of the feedstock material 128 to determine a surface contour such as the presence of a declivity or prominence on the surface. In some implementations, the feedstock information 130 may be represented as variations in contour of at least a portion of the feedstock material 128.

A magnetic sensor 110(4) may comprise a magnetometer, coil, semiconductor device, and so forth, which is sensitive to a magnetic field. For example, the magnetic sensor 110(4) may be configured to detect magnetic fields present within at least a portion of the feedstock material 128. These variations in the magnetic fields may be used to store the machine readable feedstock information 130.

An ultrasonic sensor 110(5) may be used to ultrasonically detect machine readable information of the feedstock materials 128 or the object 104 provided by elements, such as voids, cracks, embedded materials, and so forth. The ultrasonic sensor 110(5) acoustically analyzes the feedstock material 128 to determine if there are any cracks or voids in the feedstock material 128, whether created accidentally during fabrication of the feedstock material 128 or included purposefully to provide an acoustic signature to the feedstock material 128. In other implementations, one or more of an audible or infrasonic sensor may be used instead of, or in conjunction with, the ultrasonic sensor 110(5).

An ion mobility sensor 110(6) may be used to separate and identify ionized molecules in the gas phase based on their mobility in a carrier buffer gas. Based on an ion's mass, charge, size and shape (the ion mobility), the migration time through the tube is characteristic of different ions, leading to the ability to distinguish different analyte species. Thus, trace chemical analysis may be performed on the feedstock material 128, for example, by vaporizing a portion of the feedstock material 128. A thermal sensor 110(7) is a transducer that employs a temperature sensitive element. The sensing element may be a thermistor, a thermocouple, a conductor, a semiconductor element, etc. A thermal sensor 110(7) may be used to detect changes in heat radiation. For example, taggants in feedstock material 128 may be exposed to a heating source, such as a laser, and emit a heat signature. The heat signature may then be detected by the thermal sensor 110(7) to obtain information from the feedstock material 128.

A fluorescent sensor 110(8) may detect taggants illuminated with a fluorescent light, wherein the taggants will reflect differently than the actual feedstock material 128. A mass spectrometer sensor 110(9) and a gas chromotographer sensor 110(10) may be used to sense and read machine readable information provided by the chemical taggant in the feedstock material 128. For example, the feedstock material 128 may be analyzed after an emitter strikes the feedstock material 128 to vaporize a portion of the feedstock material 128. The plasma or gas resulting from the vaporizing of the feedstock material 128 may then be analyzed by a mass spectrometer, a gas chromatographer, and so forth.

In other implementations, other sensors 110(S) (not shown) may be present. For example, a capacitive sensor may be configured to determine capacitance of at least a portion of the feedstock material 128. In another example, a range camera or 3D sensor may be configured to generate 3D data about the object 104 before, during, or after fabrication of the object 104. The 3D data may be used to validate fabrication of the object 104, provide quality assurance factors, and so forth.

The I/O devices 214 may also include output devices 216 such as one or more of a display, printer, audio speakers, and so forth. In some embodiments, the I/O devices 214 may be physically incorporated with the AFD 102 or may be externally placed. For example, the AFD 102 may be in communication with a computing device 136, such as a smartphone, tablet, and so forth, which may be used to provide a user interface and receive input from a user.

The network interfaces 212 are configured to provide communications between the AFD 102 and other devices, such as the sensors 110, routers, access points, and so forth. The network interfaces 212 may include devices configured to couple to PANs, LANs, WANs, and so forth. For example, the network interfaces 212 may include devices compatible with Ethernet, Wi-Fi, Bluetooth, ZigBee, 3G, 4G, LTE, and so forth. The AFD 102 may also include one or more busses or other internal communications hardware or software that allow for the transfer of data between the various modules and components of the AFD 102.

As shown in FIG. 2, the AFD 102 may include one or more memories 218. The memory 218 may comprise one or more CRSM. The CRSM may be any one or more of an electronic storage medium, a magnetic storage medium, an optical storage medium, a quantum storage medium, a mechanical computer storage medium, and so forth. The memory 218 may provide storage of computer-readable instructions, data structures, program modules, and other data for the operation of the AFD 102. A few example functional modules are shown stored in the memory 218, although the same functionality may alternatively be implemented in hardware, firmware, or as a system on a chip (SoC).

The memory 218 may include at least one operating system (OS) module 220. The OS module 220 may be configured to manage hardware resource devices such as the I/O interfaces 210, the network interfaces 212, the I/O devices 214, and provide various services to applications or modules executing on the processors 204. The OS module 220 may implement a variant of the FreeBSD operating system as promulgated by the FreeBSD Project; other UNIX or UNIX-like operating system; a variation of the Linux operating system as promulgated by Linus Torvalds; the Windows operating system from Microsoft Corporation of Redmond, Wash., USA; or other operating systems.

Also stored in the memory 218 may be a data store 222 and one or more of the following modules. These modules may be executed as foreground applications, background tasks, daemons, and so forth. The data store 222 may use a flat file, database, linked list, tree, executable code, script, or other data structure to store information. In some implementations, the data store 222 or a portion of the data store 222 may be distributed across one or more other devices including the computing devices 136, network attached storage devices, and so forth.

A communication module 224 may be configured to establish communications with one or more of the computing devices 136, sensors 110 external to the AFD 102, or other devices. The communications may be authenticated, encrypted, and so forth. For example, the communication module 224 may be configured to implement Transport Layer Security (TLS).

The fabrication control module 132 may also be stored in the memory 218. The fabrication control module 132 is configured to use the fabrication instructions 126 to direct operation of the fabrication system 112 or other systems of the AFD 102. For example, the fabrication control module 132 may process the fabrication instructions 126 to direct motion of the extruder 112(1), control the amount of the feedstock material 128 as processed by the feedstock handler 112(2), and so forth. The fabrication instructions 126 may be stored as a single file or container, or the fabrication instructions 126 may be stored as a single file or multiple files. In other implementations, other data structures may be used to store the fabrication instructions 126. In some implementations, the fabrication control module 132 may be implemented at least in part in hardware, such as controllers, processors, and so forth.

The fabrication control module 132 may be configured to access tag data 226 as stored by the tag 122 of the starter 116. The tag data 226 may comprise one or more of a starter identification, object identification, serial number, and so forth. For example, the fabrication control module 132 may access the tag data 226 and communicate with the computing device 136 to confirm that fabrication of the object 104 is permitted.

The fabrication control module 132 may access the feedstock information 130, such as obtained from the feedstock material 128 by the reader device 142. For example, the feedstock information 130 may comprise a number that may be associated with a particular record in feedstock material data 230. The feedstock material data 230 may comprise information such as the safety data sheet information, materials performance information, production information about the feedstock material 128, and so forth, for one or more feedstock materials 128. For example, the fabrication control module 132 may use the data in the feedstock information 130 to retrieve a particular record from the feedstock material data 230 that is descriptive of the characteristics of the associated feedstock material 128.

An analysis module 234 may also be stored in the memory 218. The analysis module 234 may be configured to access machine readable feedstock information 130 as obtained from the feedstock material 128. The analysis module 234 may use the feedstock information 130 for various purposes. Operation and use of the machine readable feedstock information 130 is discussed in greater detail below with reference to FIGS. 5-7.

In some implementations, the starter 116 may omit the starter memory 124, the fabrication instructions 126, or both. In these implementations, the communication module 224 may establish a connection with a computing device 136. The AFD 102 may receive the fabrication instructions 126. The fabrication control module 132 may then use the fabrication instructions 126 as received from the computing device 136 to direct operation of the fabrication system 112. For example, the fabrication instructions 126 may direct the extruder 112(1) to fabricate at least a portion of the object 104 on the build platform 108 from the feedstock material 128.

Other modules 228 may also be present in the memory 218, as well as other data 232 in the data store 222. For example, the other modules 228 may include a digital rights management module configured to restrict access to the fabrication instructions 126. The other data 232 may include user preferences, user selected customizations of the object 104, and so forth. For example, the user may specify a particular hat from a selection of hats to be fabricated as the additional element 114. In another example, the user preferences may specify various trade-offs between quality of the object 104 fabricated and fabrication time. Continuing the example, the user may accept an object 104 having a lower quality of surface finish but that is finished in one half of the time, compared to the same object 104 fabricated with a higher quality of surface finish at a longer time.

Figure 3:
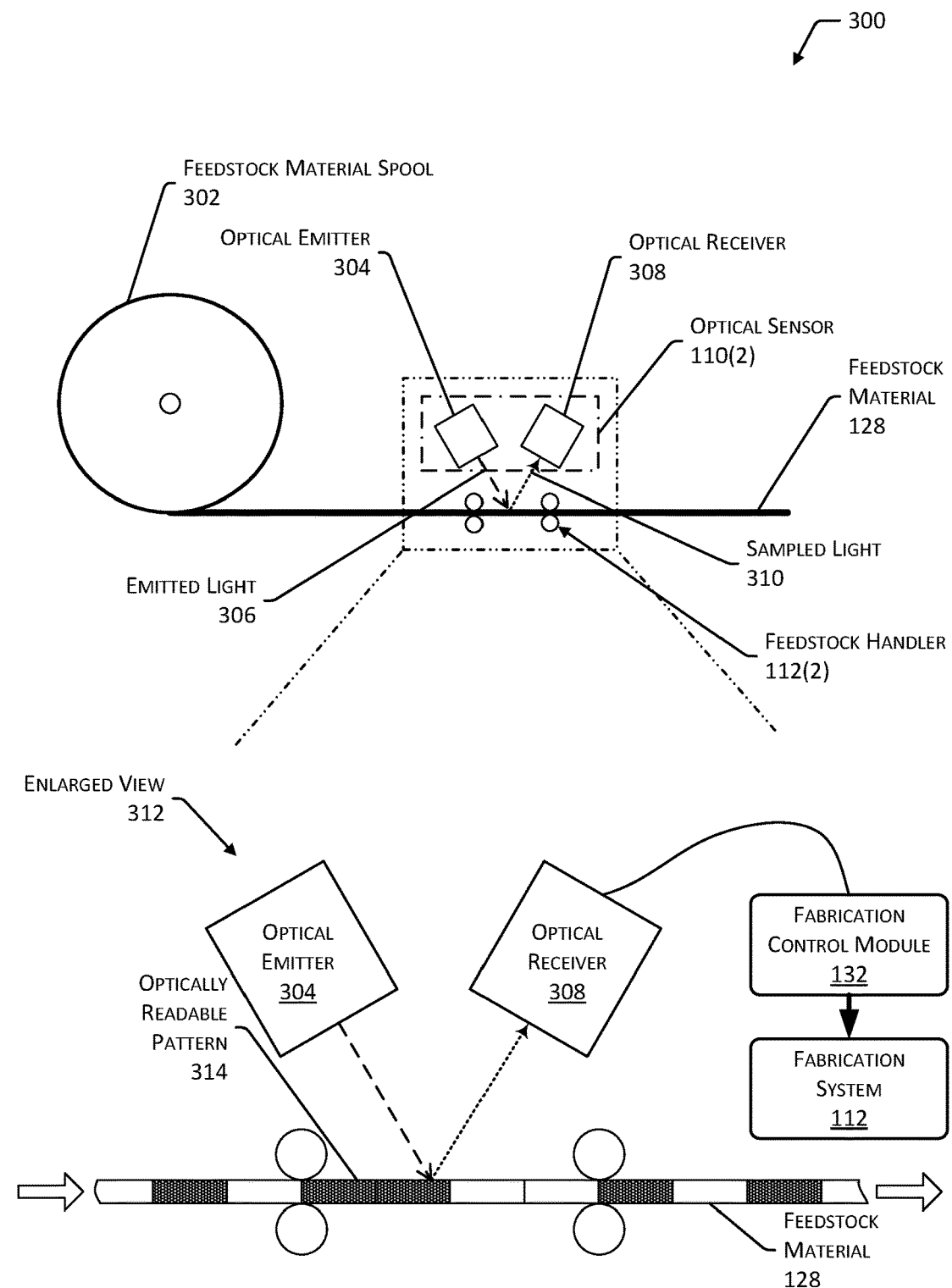
FIG. 3 illustrates a portion of the AFD configured to retrieve encoded data, such as a cryptographic key, from at least a portion of feedstock material in the starter.

FIG. 3 illustrates a portion 300 of the AFD 102 configured to retrieve machine readable feedstock information 130 from at least a portion of feedstock material 128. In other implementations, feedstock information 130 may be provided on the feedstock material 128, in the feedstock material 128, or otherwise provided with the feedstock material 128 according to a range of different usage cases, of which examples are described herein. Moreover, in other implementations, the feedstock information 130 may be analyzed using a variety of different analysis techniques, of which examples are also described herein.

As described above, the feedstock material 128 or portion thereof may be included with the starter 116. In the following illustrations, the feedstock material 128 is depicted as a filament or tape. However, in other implementations, the feedstock material 128 may comprise pellets, sheets, gels, and so forth.

A feedstock material spool 302 stores at least a portion of the feedstock material 128. In some implementations, the feedstock material spool 302 may be incorporated within the starter 116 or portion thereof. As the feedstock material 128 is dispensed from the feedstock material spool 302, it may pass through one or more portions of the feedstock handler 112(2) mechanism, such as guide rollers as depicted here. In this implementation, the optical sensor 110(2) comprises an optical emitter 304 configured to generate emitted light 306 and an optical receiver 308 configured to receive sampled light 310. For example, the optical emitter 304 may comprise a light emitting diode, an incandescent lamp, electroluminescent light, a laser, and so forth. The optical receiver 308 is configured to detect sampled light 310 as reflected, fluoresced, and so forth, by the feedstock material 128.

An enlarged view 312 depicts the apparatus in more detail. As the feedstock material 128 moves from left to right in FIG. 2, an optically readable pattern 314 may be detected by the optical sensor 110(2). For clarity of illustration, additional sensors 110 have been omitted, such as feed sensors indicating a linear measurement of feedstock material 128 that has been dispensed.

In this illustration, portions of the feedstock material 128 are optically darker or lighter with these variations used to encode binary values. For example, 0s may be indicated by a white portion while 1s are indicated by a dark portion of the feedstock material 128.

In one implementation, the variations in the feedstock material 128 comprising the optically readable pattern 314 may be surface features of feedstock material 128, such as a coating, paint, or sheath applied to the exterior of the feedstock material 128. In another implementation, the variations in the feedstock material 128 may exist beyond the surface, such as throughout the cross-section of the feedstock material 128.

In other implementations, the machine readable feedstock information 130 may be represented by other features of the feedstock material 128. For example, surface contours of the feedstock material 128 or portion thereof may be used to encode information. Continuing the example, pits and grooves in the surface of the feedstock material 128 may be used to store the machine readable feedstock information 130. In these other implementations, the other sensors 110(S) such as described above may be used to read the machine readable feedstock information 130. The optical receiver 308 may provide feedstock information 130 obtained from the feedstock material 128 to the fabrication control module 132. The feedstock information 130 may then be provided to the fabrication system 112. The feedstock information 130 may include fabrication instructions 126, which the fabrication control module 132 may use to direct operation of the fabrication system 112.

Figure 4:
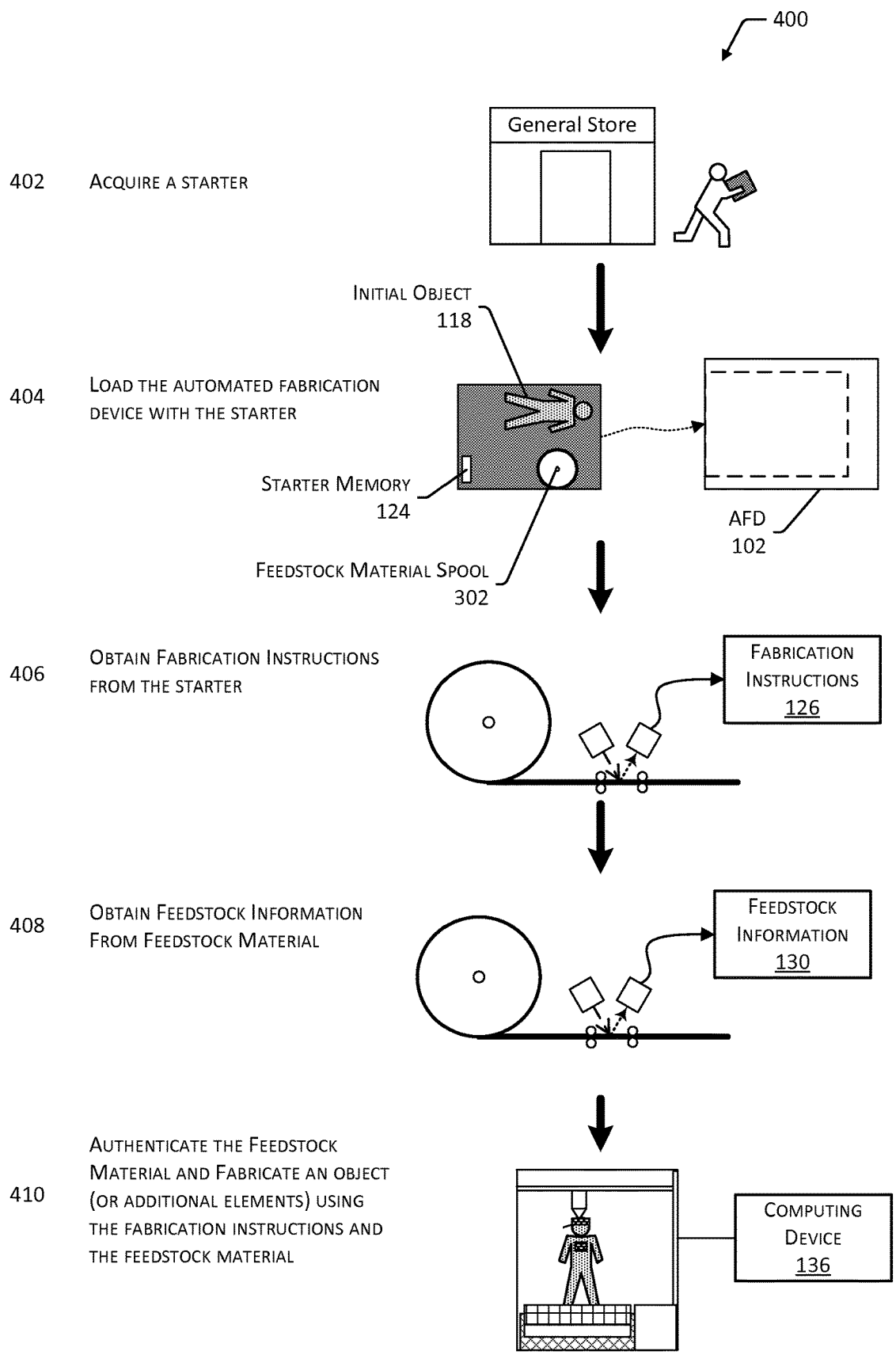
FIG. 4 illustrates a scenario in which a starter is used to fabricate an object.

FIG. 4 illustrates a scenario 400 in which a starter 116 is used to fabricate an object 104. In this scenario, at 402, the user has acquired a starter 116. For example, the starter 116 may have been acquired from a store or delivered to the user. At 404, the starter 116 is loaded into, or otherwise coupled with, the AFD 102. For example, the starter 116 may comprise a cartridge, which is inserted into at least a portion of the AFD 102 and is engaged at least in part by the mount 106. As described above in FIG. 1, the mount 106 may be configured to retain the build platform 108 during operation. In other implementations, a receptacle, slot, or other feature may be configured to engage the at least a portion of the starter 116. For example, the mount 106 may be arranged within the receptacle and configured to couple to a housing of the starter 116.

At 406, at least a portion of the fabrication instructions 126 are obtained from the starter 116. As the feedstock material 128 is processed through the sensor 110, the fabrication instructions 126 may be accessed from the feedstock materials 128 of starter 116. For example, the fabrication instructions 126 may include digital certificates that may be used to authenticate the AFD 102 with a computing device 136. Once authenticated, the computing device 136 may send fabrication instructions 126 to the AFD 102 for use. In another example, the fabrication instructions 126 may include a cryptographic key. The cryptographic key may be used to decrypt encrypted fabrication instructions 126 received from the computing device 136.

At 408, the machine readable feedstock information 130 is obtained from the feedstock materials 128. For example, a portion of the feedstock material 128 may be processed through the sensor 110, as described above with regard to FIG. 3, and the machine readable feedstock information 130 may be retrieved.

At 410, the feedstock information 130 is authenticated to verify the source or composition of the feedstock material 128. A reader device 142 may receive the feedstock information 130 and a characteristic may be determined to be associated with the feedstock material 128. The characteristic may include credentials provided, for example, by a digital signature included in the feedstock information 130 that may be compared to information maintained by computing device 136, e.g., in a database or within an authentication server. The credentials may be in cleartext or encrypted. For example, the digital signature may comprise an encrypted token value, the token being associated with a particular source, composition, and so forth. In some implementations, each token may be unique with respect to other tokens within the system 100. The token may be transmitted via the network 134 to an authentication server. The authentication server may be maintained by a manufacturer, distributor, or other authorized party. The token may be analyzed, compared to previously stored data, and so forth to determine validity. If the credentials match, the source of the feedstock materials is authenticated and use of the feedstock materials is authorized thereby ensuring an object 104 is formed with feedstock material meeting expected standards specified by an SDS. For example, using fabrication instructions 126 associated with the object 104, a degree of correspondence between the characteristic associated with the feedstock material 128 and a characteristic specified by the fabrication instructions 126 may be determined. If the degree of correspondence is determined to be below a threshold value, the fabrication instructions 126 may be modified and a version of the object 104 specified by the modified fabrication instructions may be fabricated that differs from that specified in the fabrication instructions 126. For example, the modification may include adding a feature on the object 104, deleting a feature, changing a proportion, scaling (such as it's done at ½ full size instead of full size), changing color, etc.

In another example, the modification may include changes that are less obtrusive or may even be undetectable by a user. For example, every object 104 fabricated by the AFD 102 may be fabricated to encode in the final physical structure information by using the placement of material, color of material, shape, and so forth. In another example, the object 104 may include CRSM used to store the information. The information may include an identifier of the particular AFD 102 that fabricated the object 104, a location of the AFD 102 during fabrication, a user account associated with the fabrication, a serial number of the object 104, version of fabrication instructions 126 used, and so forth. The information may be used to verify that a particular object 104 is authentic, to determine unauthorized reproductions, and so forth.

In some implementations, authentication may take place at several times in the process. For example, the feedstock material 128 may be authenticated prior to use, such as by the reader device 142 as feedstock material 128 is delivered to an extruder (112)1. The feedstock material 128, now formed into the object 104 may be authenticated after use. For example, a subsequent reader device 142 may analyze the object 104 and authenticate again. Multiple or ongoing authentication may be used to maintain information such as the authorized feedstock material 128 being present from start to finish of the object 104.

Figure 5A:
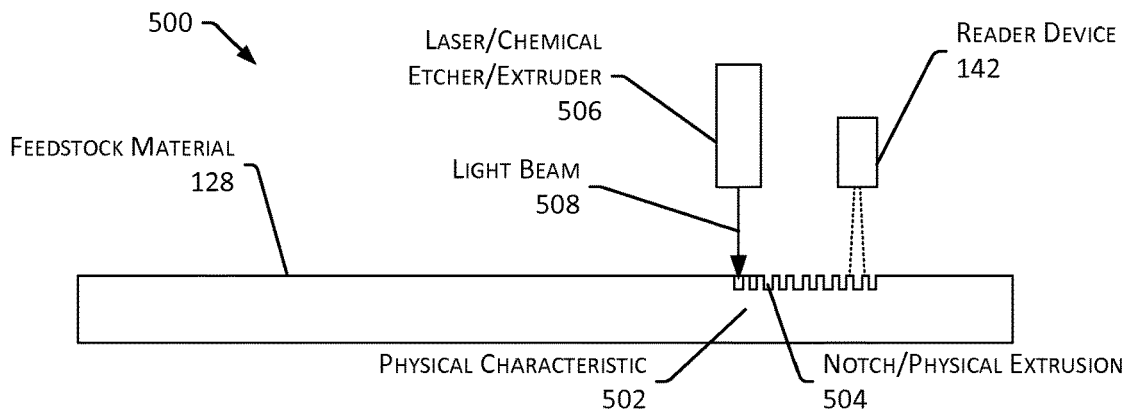
FIGS. 5A-D illustrate feedstock material that has at least one characteristic for providing the machine readable information to the feedstock material.

FIG. 5A illustrates a scenario 500 in which feedstock material 128 is etched to form a physical characteristic 502 for providing machine readable feedstock information 130 about the feedstock material 128. Various types of feedstock material 128 are available in a wide array of compositions. High-end industrial feedstock material 128 may include nickel super-alloys and titanium. Feedstock material 128 may also include plastic (polylactic acid and acrylonitrile butadiene styrene), wood, graphene, polymers, metal, glass, ceramic, food products (e.g., hydrocolloids, dough, protein pastes, chocolate, and vegetable gels), and so forth. For creating physical characteristics 502 on the feedstock material 128, a notch, physical extrusion 504, or other features may be formed by a laser 506 that produces a light beam 508. The physical characteristics 502 may store information that may be detected therefrom by a sensor, such as a reader device 142. The machine readable information provided to the feedstock materials 128 may be digitally signed data. A reader device 142 may be an optical sensor 110(2), ultrasonic transducer, magnetic detector, ion mobility detector, thermal transducer, and so forth. The physical pattern may then be detected and the machine readable information of the feedstock material 128 processed so that AFD 102 may use the machine readable information of the feedstock material 128 to produce an object 104.

Physical characteristics 502 may be determined using various types of reader devices 142. For example, a reader device 142 may capture a digital image wherein an attribute is detected, measured, or identified. Features of the physical characteristic 502 may be extracted from image data at various levels of complexity. These extracted features may include lines, edges, ridges, localized interest points such as corners, blobs or points, as well as more complex features related to texture or shape.

Figure 5B:
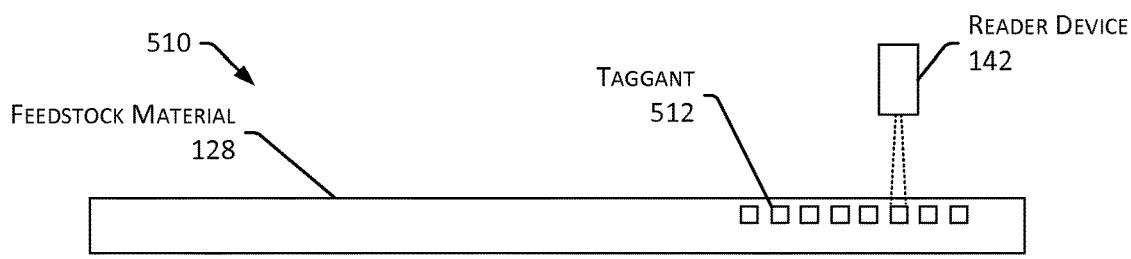

FIG. 5B illustrates a scenario 510, wherein a taggant 512 has been added to the feedstock material 128. Taggants 512 are materials, substances, molecules, ions, polymers, nanoparticles, microparticles, or other matter, incorporated into, onto, or otherwise associated with feedstock material 128 for the purposes of identification or quantitation. A physical taggant 512 provided to the feedstock material 128 may include microscopic particles. The microscopic particles may be made of different materials. The taggant 512 may be a chemical taggant that is added to the feedstock material 128. Alternatively, the taggant 512 may be a physical taggant that is injected into the feedstock material 128. A reader device 142 may then be used to detect the taggant 512. For example, the reader device 142 may be a fluorescent sensor, wherein the taggant 512, when illuminated with a fluorescent light, will reflect differently than the actual feedstock material 128. The taggant 512 may itself provide indicative information or multiple taggants 512 may be used to provide information associated with the feedstock material 128. Taggants 512 may also be analyzed using a microscopic reader device 142 that optically senses the one or more taggants 512 in the feedstock material 128. For a chemical taggant 512, a chemical reader device 142, such as a mass spectrometer, a gas chromatographer, and so forth, may be used to sense and read machine readable information provided by the chemical taggant 512 in the feedstock material 128.

Figure 5C:
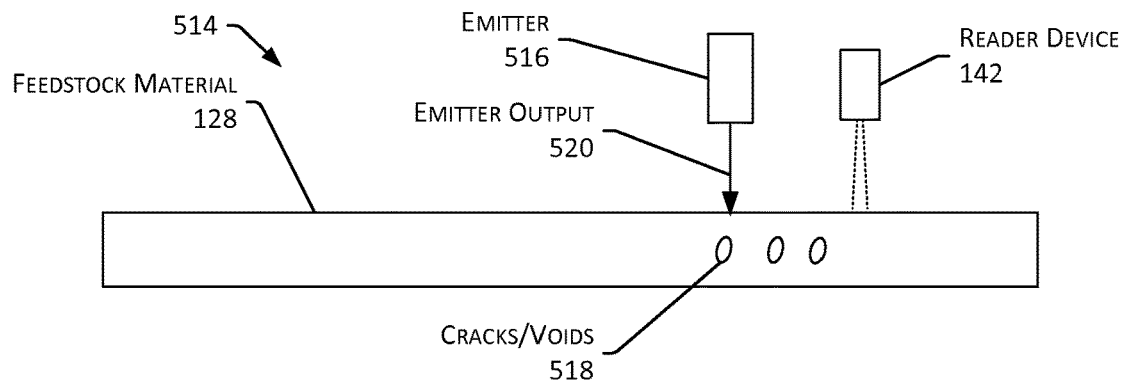

FIG. 5C illustrates a scenario 514, wherein an emitter 516 and reader device 142 are used to directly scan the feedstock material 128. For example, the feedstock material 128 may be analyzed by a reader device 142 after an emitter 516 strikes the feedstock material 128 with a light beam 508 to vaporize a portion of the feedstock material 128. The plasma or gas resulting from the vaporizing of the feedstock material 128 may then be analyzed by a reader device 142, such as a mass spectrometer, a gas chromatographer, and so forth. Cracks and voids 518 may be detected using an emitter 516. In one implementation the emitter 516 may be a neutron source configured to bombard the feedstock material 128 with emitter output 520, such as neutrons, protons, electrons, or energy. The reader device 142 may determine the composition of the feedstock material 128 based on interaction of the emitter output 520 with the feedstock material 128. In another implementation, the emitter 516 may be an ultrasonic transducer that is used to acoustically analyze the feedstock material 128 to determine if there are any cracks or voids 518 in the feedstock material 128, whether created accidentally during fabrication of the feedstock material 128 or included purposefully to provide an acoustic signature to the feedstock material 128. Cracks and voids 518 also may be detected using an x-ray or other particle emission techniques. These cracks and voids 518 may be used to store the machine readable feedstock information 130.

Figure 5D:
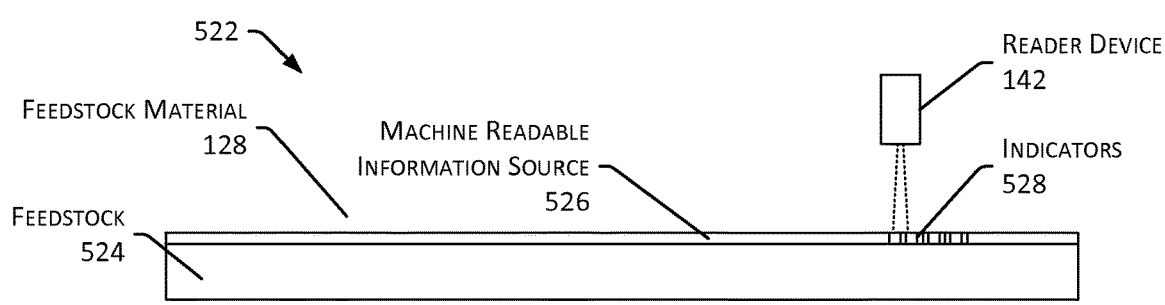

FIG. 5D illustrates a scenario 522, wherein feedstock material 128 includes the feedstock 524 used in creation of an object 104 as well as a machine readable information source 526 coupled to the feedstock 524. The machine readable information source 526 may be a metal wire or strip that is physically or magnetically provided with indicators 528 to provide information regarding the feedstock 524. The feedstock 524 is used to form the object 104 while the machine readable information source 526 is scanned by a reader device 142 to detect indicators 528 to verify that the proper feedstock 524 is being used. The reader device 142 may be an optical, magnetic, or other technology device that is used to extract the machine readable information from the machine readable information source 526 of the feedstock material 128. Together, the feedstock 524 and the machine readable information source 526 form the feedstock material 128.

Figure 6:
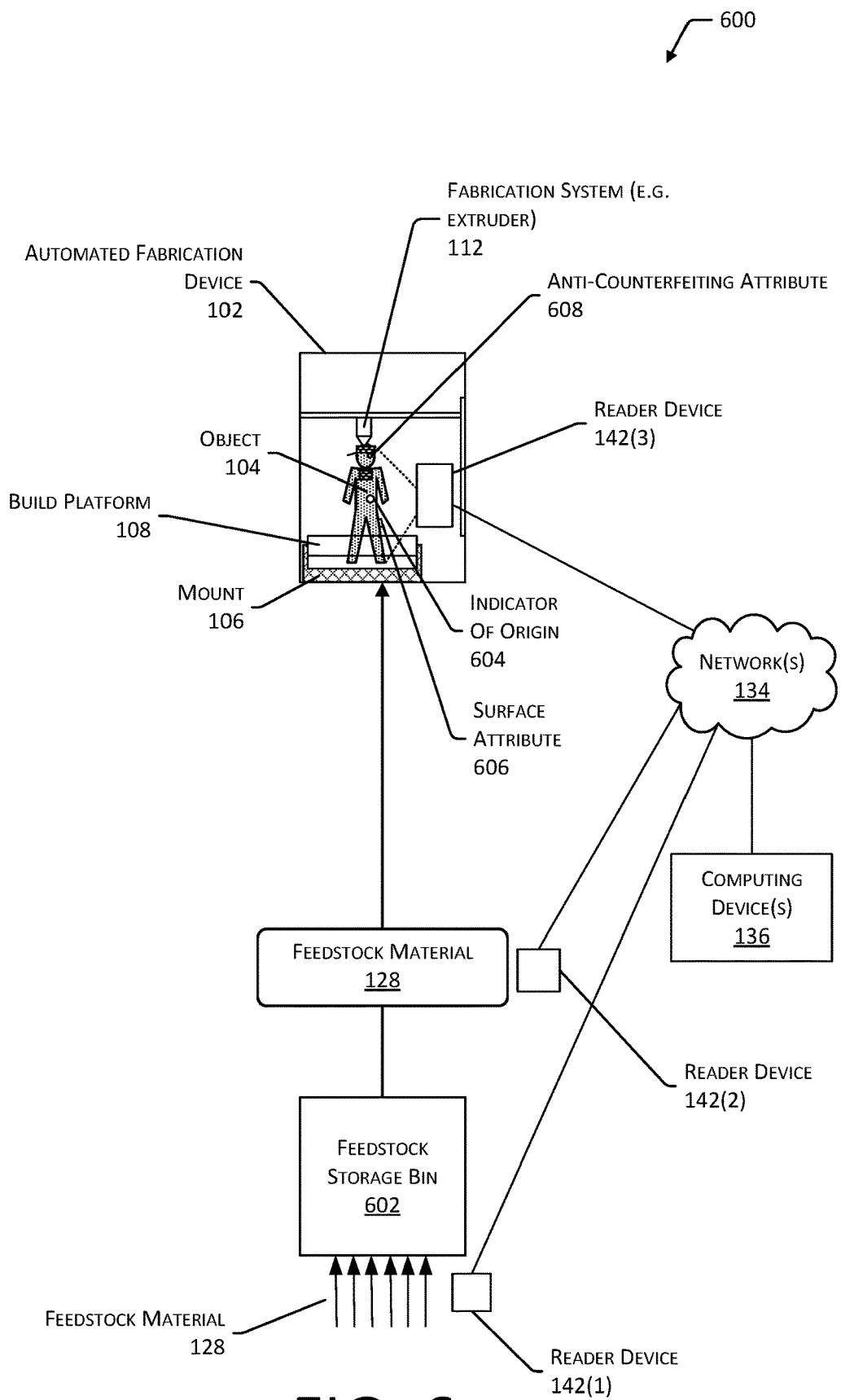
FIG. 6 illustrates an automated fabrication system that includes an AFD and a feedstock storage bin for receiving feedstock material.

FIG. 6 illustrates an automated fabrication system 600 that includes an AFD 102 and a feedstock storage bin 602 for receiving feedstock material 128, such as pellets, filaments, and so forth. The AFD 102 may include a computing device 136 that references a private key to decrypt information provided by the encoding or to authenticate the materials used, the location associated with the feedstock material 128 or the object 104. The automated fabrication system 600 may also include reader devices 142(1), 142(2), 142(3). Machine readable information is obtained by reader devices 142(1), 142(2), 142(3) that scan the feedstock material 128 or the object itself 104. The machine readable information may be provided to a computing device 136 to authenticate, authorize the use of, prevent unauthorized reproduction of the feedstock material 128 or the object 104, or for other purposes. However, the reader devices 142(1), 142(2), 142 (3) may process information obtained by reading of the feedstock material 128 or the object 104 to perform one or more of authenticating the feedstock material 128 or the object 104, authorizing the use of feedstock material 128, and preventing the unauthorized reproduction of the feedstock material 128 or the object 104. For example, the feedstock material 128 may need to meet certain safety standards for the production of the object 104. Safety standards for the production of the object 104 may include ratings of toxicity, brittleness, and other features of the feedstock materials 128. However, the safety standards may also refer to feedstock material 128 not matching minor handling specifications for the feedstock material 128. The reader devices 142(1), 142(2), 142(3) may each include one or more components. The combination of components may depend on the application, e.g., the information that is being obtained and analyzed.

The reader device 142(1) may be used to verify the proper feedstock material 128 is provided to the feedstock storage bin 602. The proper feedstock material 128 may be determined by retrieving information associated with the object 104. For example, a data store may be accessed to retrieve information such as the particular feedstock material 128 that is approved for use by a certifying entity in a particular geographic location for that object 104 or type of object. Continuing the example, if the object 104 is a toy and the AFD 102 is in the European Union, the feedstock material 128 may be deemed proper when compliant with the European Conformity (CE) standard.

In some implementations, proper feedstock material 128 may be determined based on individualized data. For example, where the feedstock material 128 is edible, information associated with a user may be assessed. Continuing the example, where the user is allergic to peanuts, the reader device 142(1) may determine machine readable feedstock information 130 that may be indicative of, or used to determine, presence of peanuts in the feedstock material 128. A proper feedstock material 128 in this situation would be one free from peanut products. In other examples, user parameters such as daily caloric intake limits and so forth may be specified and used to determine if the feedstock material 128 includes too many calories. Biometric devices may be used to acquire the individualized data, such as information about how many calories the user has burned so far in a particular day.

The reader device 142(1) may be used at each stage of custody of the feedstock material 128 prior to being provided to the feedstock storage bin 602. The reader device 142(1) may also be used to check the feedstock material 128 as provided to the feedstock storage bin 602 for adulteration or to ensure the feedstock material 128 is not an unauthorized reproduction.

The reader device 142(2) may be used to monitor the feedstock material 128 as it is provided from the feedstock storage bin 602 to the AFD 102. The reader device 142(2) may verify that the correct feedstock material 128 is being provided to the AFD 102. The reader device 142(2) may further ensure that the feedstock material 128 has not been adulterated or is not an unauthorized reproduction. For example, warranty registration on the object 104 may be dependent on production using an approved feedstock material 128.

The reader device 142(3) may be used to monitor the object 104 produced by the AFD 102. The reader device 142(3) may monitor each stage of deposition of feedstock material 128 during the production of the object 104 or may monitor the final result for the object 104. For example, the reader device 142(3) may check after each layer of feedstock material 128 is applied by the AFD 102 to ensure that each layer is correctly formed by analyzing one or more of a dimension, orientation, or angle of the applied layers or the completed object 104, or by ensuring that the adhesion of the applied layer to a base, scaffolding 120 or previous layer is correct. The AFD 102 may be configured to apply an indicator of origin 604 to the object 104, wherein the reader device 142(3) may be used to verify the indicator of origin 604 on the object 104. The object 104 may also include a surface attribute 606 that may be used for identification and verification of the authenticity of the object 104. Again, the reader device 142(3) may be used to sense and analyze the surface attribute 606. Moreover, the surface attribute 606 may be configured as a weak structure, wherein the object 104 may break or otherwise experience a physical, chemical, or other type of deterioration that then becomes detectable. Additional techniques may be utilized in the formation of the object 104 to prevent unauthorized reproduction. For example, the reader device 142(3) may be used to detect an anti-counterfeiting attribute 608 of the object 104. The anti-counterfeiting attribute 608 may be used to detect unauthorized reproduction, to ensure that the object 104 meets physical qualifications to uniquely identify the object 104, to ensure authenticity of the object 104, and so forth.

In one embodiment, the reader devices 142(1), 142(2), 142(3) may provide information, such as an image, to a computing device 136 via the network(s) 134. The information may be provided to the network(s) 134 wirelessly or via wired communication. The processing to authenticate, verify, authorize use, and so forth, may thus be performed at the computing device 136 based on information obtained from reader devices 142(1), 142(2), and 142(3). A result from the processing may be provided by the computing device 136 to the AFD 102.

Illustrative Processes

Figure 7:
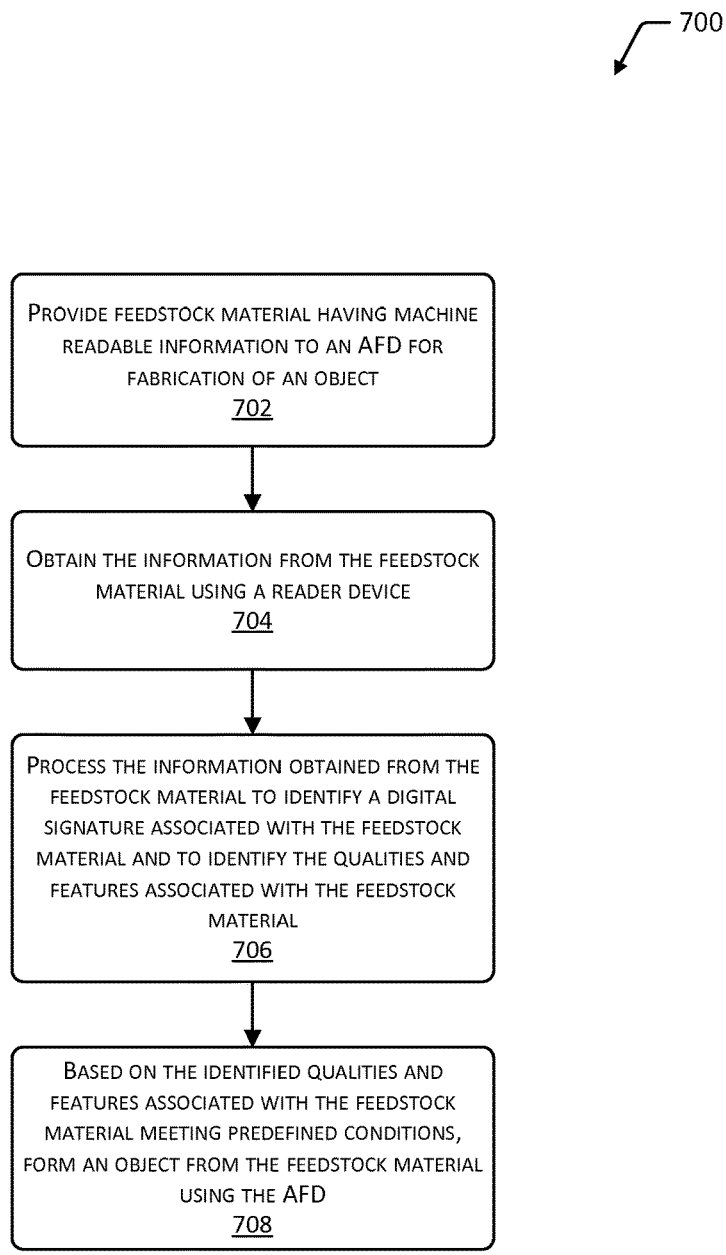
FIG. 7 illustrates a flow diagram of a process for analyzing machine readable information of feedstock material, processing characteristics identified during the analysis, and verifying the feedstock material meets a requirement prescribed by the identified characteristic.

FIG. 7 illustrates a flow diagram 700 of a process for analyzing information of feedstock material 128, processing the information to identify characteristics of the feedstock material 128 and verifying that the feedstock material 128 meets required qualities and features prescribed by the characteristic. The process may be implemented at least in part using the system 100 as described above.

At 702, feedstock material 128 having machine readable information is provided to an AFD 102 for fabrication of an object 104. As described above, the information may include a physical characteristic 502 that includes at least one of a notch 504 extruded physically into the feedstock material 128, a magnetic coding provided physically on the feedstock material 128, a taggant 512 provided with the feedstock material 128, and so forth. For a physical characteristic 502, a laser, chemical etcher, or other device 506 may be used to create a physical characteristic 502 on the feedstock material 128. For example, a laser 506 may be used to produce a light beam 508 to form a notch or physical extrusion 504 to provide information that may be detected therefrom. Taggants 512 may be provided on or in the feedstock material 128. Voids and cracks 518 may be formed for sensing using ultrasonic analysis devices. The machine readable information provided to the feedstock materials 128 may be digitally signed.

At 704, using a reader device 142, the information is obtained from the feedstock material 128. The information may be obtained using various types of sensors 110. For example, a sensor 110 may capture a digital image wherein an attribute is detected, measured, or identified. Features of the characteristic may be extracted from image data at various levels of complexity.

At 706 the information obtained from the feedstock material 128 is processed. The information provided with the feedstock material 128 is processed to identify the qualities and features associated with the feedstock material 128. For example, the information may be inspected for a digital signature that may be used to authenticate the information provided with the feedstock material 128. The information obtained from the feedstock material 128 is used to identify the qualities and features associated with the feedstock material 128, such as the feedstock material 128 meets safety requirements specified in the fabrication instructions 126.

At 708, based on the identified qualities and features associated with the feedstock material 128 meeting predefined conditions, an object 104 is formed from the feedstock material 128 using the AFD 102. For example, the predefined conditions may be set forth in the fabrication instructions 126 that specify a particular type of plastic is to be used for fabricating a toy.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
    feedstock material for fabrication of an object, wherein the feedstock material includes machine readable information identifying a characteristic of the feedstock material; and
    an automated fabrication device, comprising:
        a mount configured to retain a build platform during operation;
        an extruder configured to use the feedstock material to fabricate the object on the build platform according to fabrication instructions;
        a reader device to read the machine readable information from the feedstock material; and
        a computing device including one or more memories storing computer-executable instructions and one or more hardware processors configured to execute the computer-executable instructions to:
            process the machine readable information of the feedstock material;
            determine the characteristic associated with the feedstock material based on the machine readable information;
            access the fabrication instructions to determine a specified characteristic of the feedstock material to be used during fabrication;
            verify that the characteristic associated with the feedstock material matches the specified characteristic;
            access individualized data indicating information about a user, wherein the individualized data indicates one or more of:

a characteristic of the feedstock material restricted from the user, or a characteristic of the feedstock material required for the user;

determine correspondence between the characteristic associated with the feedstock material and the individualized data;

based on the correspondence between the characteristic associated with the feedstock material and the individualized data, authorize use of the feedstock material to produce the object; and fabricate the object specified by the fabrication instructions.

2. The system of claim 1, the computing device further configured to determine that the characteristic associated with the feedstock material includes a safety requirement associated with the feedstock material, wherein the safety requirement is indicative of feedstock material being safe to use for producing the object.

3. The system of claim 1, the computing device further configured to determine that the characteristic associated with the feedstock material includes quality assurance factors for the object being produced, the quality assurance factors including factors for verifying that the feedstock material meets prescribed safety requirements specified by the fabrication instructions, factors for ensuring the feedstock material provides a correct quality and fit for the object being produced, and factors for ensuring the object is being formed correctly.

4. A system, comprising:

feedstock material for fabrication of an object by an automated fabrication device, wherein the feedstock material includes machine readable information associated with the feedstock material;

a device to read the machine readable information from the feedstock material; and a computing device including one or more memories storing computer-executable instructions and one or more hardware processors configured to execute the computer-executable instructions to:

receive the machine readable information from the device;

determine, from the machine readable information, a first characteristic associated with the feedstock material;

perform an analysis of the feedstock material to determine a second characteristic of the feedstock material;

determine a degree of correspondence between the first characteristic from the machine readable information and the second characteristic of the feedstock material;

access fabrication instructions for use of the feedstock material, wherein the fabrication instructions indicate a first version of an object; and based on the degree of correspondence, modify the fabrication instructions to indicate a second version of the object.

5. The system of claim 4, the one or more processors further configured to execute the computer-executable instructions to:

fabricate the second version of the object specified by the modified fabrication instructions, wherein the second version differs from the first version.

6. The system of claim 4, the one or more processors further configured to execute the computer-executable instructions to identify, from the machine readable information, at least one of a feature, a code, or a taggant to indicate a source of the object.

7. The system of claim 4, the one or more processors further configured to execute the computer-executable instructions to compare the machine readable information to the fabrication instructions and to determine the machine readable information is indicative of at least one of authenticity of the object, manufacturer, or country of origin by comparing the machine readable information to the fabrication instructions.

8. The system of claim 4, the one or more processors further configured to execute the computer-executable instructions to process the machine readable information provided by at least one of a feature, a code, or a taggant for use by the automated fabrication device to produce the object.

9. The system of claim 4, the one or more processors further configured to execute the computer-executable instructions to determine that the machine readable information includes one or more of a chemical or physical marker added to the feedstock material and to determine an authenticity of the object using the one or more of a chemical or physical marker added to the feedstock material.

10. The system of claim 4, the one or more processors further configured to execute the computer-executable instructions to determine that the machine readable information includes a marker and to determine that the feedstock material is an authorized reproduction based on one or more of a presence of the marker in the feedstock material or a comparison of the marker to markers in a database.

11. The system of claim 4, wherein the machine readable information includes one or more of:

physical pattern formed by at least one of laser etching, lithography, or milling a pattern on the feedstock material, the pattern being analyzed to determine the machine readable information; or a magnetic coding provided physically with the feedstock material, the magnetic coding analyzed to determine the machine readable information.

12. The system of claim 4, wherein the feedstock material comprises a food product, the food product including the machine readable information formed on or in the food product.

13. A system, comprising:

a device to read machine readable information from feedstock material;

one or more memories storing computer-executable instructions; and one or more hardware processors configured to execute the computer-executable instructions to:

access fabrication instructions to determine a specified characteristic of the feedstock material to be used during fabrication;

process the machine readable information obtained from the feedstock material by the device to determine a characteristic associated with the feedstock material matches the specified characteristic in the fabrication instructions;

produce an object using the feedstock material based on the fabrication instructions, wherein the object includes a detectable feature indicated in the fabrication instructions;

determine that the object includes the detectable feature; and based on the object including the detectable feature, determine the feedstock material is from an authentic source.

14. The system of claim 13, further comprising:
an extruder configured to use the feedstock material to fabricate the object according to the fabrication instructions, the machine readable information of the feedstock material being destroyed during the fabricating.

15. The system of claim 13, the one or more processors further configured to execute the computer-executable instructions to:
determine that a degree of correspondence between the specified characteristic indicated in the fabrication instructions and the characteristic associated with the feedstock material is below a threshold value;
modify the fabrication instructions to form modified fabrication instructions; and
fabricate a version of an object specified by the modified fabrication instructions that differs from a version specified in the fabrication instructions.

16. The system of claim 13, further comprising
a sensor for scanning the object produced using the feedstock material; and
the one or more processors further configured to execute the computer-executable instructions to determine the object meets predetermined requirements by one or more of:
accessing a standard defining desired characteristics of the feedstock material, scanning the object with the sensor to determine the characteristic associated with the feedstock material, and verifying that the characteristic associated with the feedstock material in the object meets the standard defining desired characteristics of the feedstock material;
scanning the object with the sensor to determine a quality and dimension for the object and verifying the quality and dimension of the object obtained by the sensor matches the specified characteristic in the fabrication instructions; or
authenticating the feedstock material in the object by comparing the machine readable information provided by the feedstock material in the object to information previously stored in memory.

17. The system of claim 13, the one or more processors further configured to execute the computer-executable instructions to:
obtain a digital signature from the machine readable information;
validate the digital signature to authenticate the machine readable information associated with the feedstock material; and
based on the digital signature being validated and the characteristic associated with the feedstock material matching the specified characteristic in the fabrication instructions, authorize use of the feedstock material to produce an object.

18. The system of claim 4, further comprising:
an extruder configured to use the feedstock material to fabricate the object according to fabrication instructions, the machine readable information of the feedstock material being destroyed during the fabricating.

19. The system of claim 4, the computing device further configured to determine that the characteristic associated with the feedstock material includes a safety requirement associated with the feedstock material, wherein the safety requirement is indicative of feedstock material being safe to use for producing the object.

20. The system of claim 13, wherein the feedstock material comprises a food product, the food product including the machine readable information formed on or in the food product.

* * * * *

UNITED STATES PATENT AND TRADEMARK OFFICE
CERTIFICATE OF CORRECTION

| | | Page 1 of 1 |
|---|---|---|
| PATENT NO. | : 10,549,487 B1 | |
| APPLICATION NO. | : 14/838123 | |
| DATED | : February 4, 2020 | |
| INVENTOR(S) | : William Alexander Strand et al. | |

It is certified that error appears in the above-identified patent and that said Letters Patent is hereby corrected as shown below:

In the Claims

Column 24, Line 36, Claim 11:
Currently Reads: physical pattern formed
Where it should read: --a physical pattern formed--

Column 26, Line 30, Claim 19:
Currently Reads: indicative of feedstock material
Where it should read: --indicative of the feedstock material--

Signed and Sealed this
Seventh Day of April, 2020

Andrei Iancu
*Director of the United States Patent and Trademark Office*